(12) United States Patent
Dean et al.

US006239513B1

(10) Patent No.: US 6,239,513 B1
(45) Date of Patent: May 29, 2001

(54) EMERGENCY SUPPLEMENTAL POWER SUPPLY FOR OUTAGE PROTECTION OF CRITICAL ELECTRIC LOADS

(75) Inventors: Michael G. Dean, Valley Center; Kenneth R. Metts, Norwalk, both of CA (US)

(73) Assignee: Design Power Solutions International, Escondido, CA (US)

( * ) Notice: Subject to any disclaimer, the term of this patent is extended or adjusted under 35 U.S.C. 154(b) by 0 days.

(21) Appl. No.: 09/513,276

(22) Filed: Feb. 24, 2000

(51) Int. Cl.$^7$ ....................................... H02J 7/00
(52) U.S. Cl. ................. 307/64; 307/68; 307/84; 322/4
(58) Field of Search .................. 307/64, 68, 84; 290/7, 4 R; 322/9, 4, 32

(56) References Cited

U.S. PATENT DOCUMENTS 4,412,170 * 10/1983 Roesel, Jr. ............................. 307/64
4,460,834 * 7/1984 Gottfried ................................. 307/64

* cited by examiner

Primary Examiner—Shawn Riley
(74) Attorney, Agent, or Firm—John J. Murphey

(57) ABSTRACT

An emergency supplemental power supply for outage protection of critical electric equipment load powered from a commercial power grid, including a first Variable speed drive, a second Variable speed drive, a first asynchronous motor powered from the first Variable speed drive for turning a fly-wheel attached thereto to ramp-up and maintain a level of expendable kinetic energy in the fly-wheel, the fly-wheel coupled to a first synchronous alternating current generator for driving the generator in a no-load, standby condition, a second asynchronous motor coupled to a second synchronous alternating current generator, in combination, and interposed the second Variable speed drive and the critical electric equipment load, a prime mover including a coupling between the prime mover to the second asynchronous motor/second synchronous alternating current generator combination, and, a computer processor interconnected all elements for maintaining the frequency of alternating current output from the first synchronous alternating current generator slightly above the frequency of the commercial power on the grid wherein, the emergency contactor, is arranged to close upon the sagging or outage of incoming grid power to the critical load and allow the kinetic energy in the rotating fly-wheel to drive the first synchronous alternating current generator and produce a decaying alternating current.

26 Claims, 11 Drawing Sheets

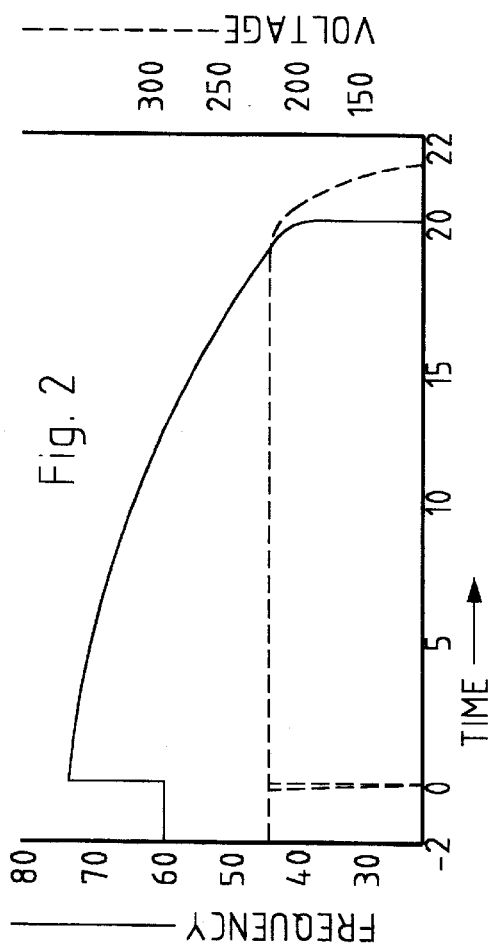
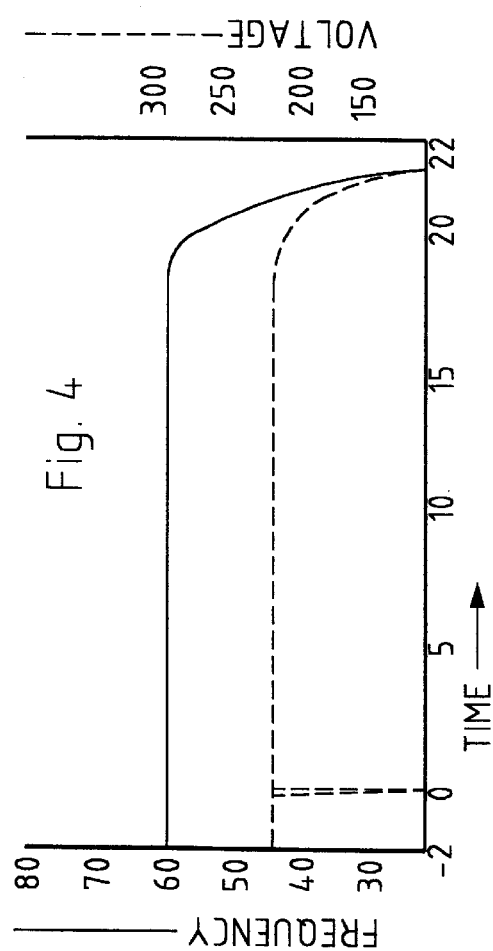

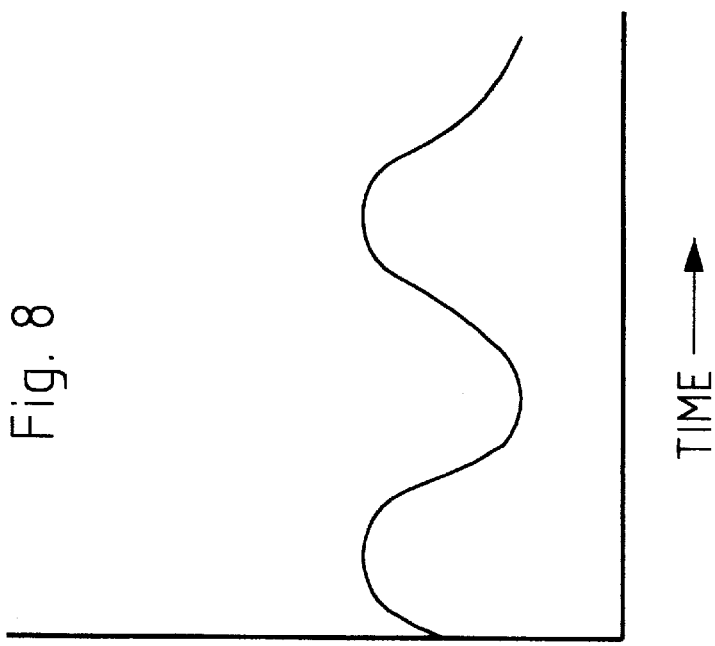
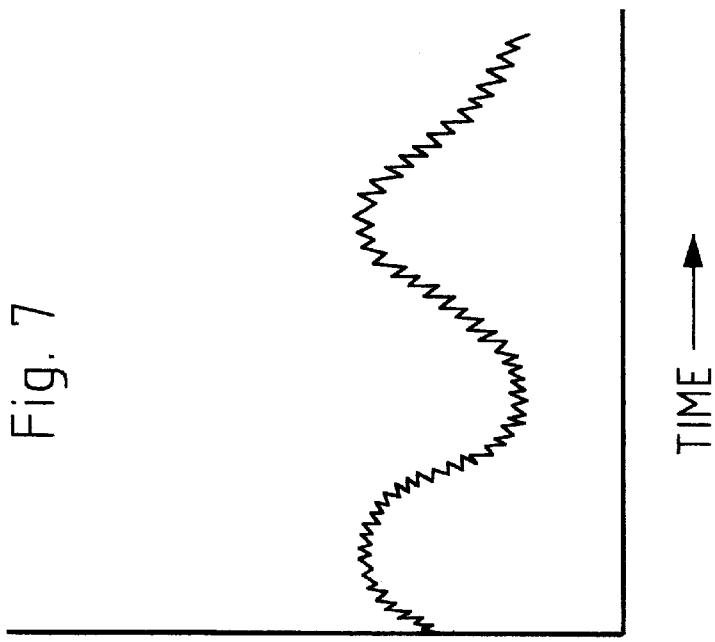

EMERGENCY SUPPLEMENTAL POWER SUPPLY FOR OUTAGE PROTECTION OF CRITICAL ELECTRIC LOADS

BACKGROUND OF THE INVENTION

1. Field of the Invention

This invention pertains to the field of emergency power systems. More particularly, it pertains to a rotary dynamo device that is close-coupled to a flywheel to provide instant short-term alternating current, with maintained voltage regulation, to critical electric loads that may include frequency tolerant devices.

2. Description of the Prior Art

Commercial electrical power available today is becoming unreliable due to the growing number of electrical loads placed on the electrical power grid. In addition, many of the new loads on the power grid are critical in their need for constant frequency and/or voltage. These loads are usually tolerant of a small change in frequency, however, they cannot tolerate an instantaneous loss of power without concomitant damage.

For instance, some modern molding machines and metal-forming machines require constant power for sustained operation. They will tolerate only momentary and short-span variations in voltage and frequency, however, they cannot tolerate an unplanned, instantaneous, total loss of power. Should this occur, the molding machine will likely seize and possibly catch fire, from the high temperature material trapped in the mold, while the metal-forming machine will begin to spin down with the cutting tool remaining against the work piece and often will cause unplanned cutting on the work piece that destroys it. In the case of stand-alone computers and computer-driven machinery, the instantaneous and continuous loss of power may result in corruption of the computer files or loss of important program data.

Momentary electrical outages, frequency or voltage fluctuation (sags and spikes), extended outages and questionable return of normal power to an electrical load are thus becoming common place. These electrical power problems affect all governmental, commercial, industrial and private sectors of society. These locations that are affected include but are not limited to National Security, Law Enforcement, Hospitals, Communication, (cellular, paging services, satellite data recovery sites, local telephone service, microwave and antenna repeater sites), Radio and Television Broadcasting, Commercial Data Centers and any other electrical load supported or backed up by the commercial electric grid.

In order to ameliorate the potentially disastrous effects of such interruptions in commercial power to critical electric machines, an industry has grown up around a combination of electrical equipment that has, as its goal, the immediate implementation of supplemental alternating current to the electrical load. This supplemental alternating current must be frequency and voltage stable for a period of time varying from a few seconds, such as between about 8 seconds to 20 seconds, to a longer period, such as indefinitely or until the resumption of commercial power. In the short periods, such as 8 to 20 seconds, the critical machines enter a shut-down program designed to save the machine and the product produced by the machine. In longer periods, varying anywhere from 20 seconds to as much as hours or days, the load is serviced by the supplemental alternating current until the resumption of commercial power. In the case of the molding machines, the 8 to 20 second shut-down program would include the immediate opening of the mold and the expelling of the part being molded to free the machine from possible fire or lock-up by virtue of over-curing the material caught in the mold. In the case of metal-forming machines, the short shut-down program would be the immediate withdrawal of the cutting tool to preserve the work piece in its partially-formed configuration and then a shut down of the work piece drive motor. In the case of computers and computer-controlled machinery, the 8 to 20 second shutdown program would include the pre-programmed shut down of various subassemblies of the computer until the entire computer and processor are turned off resulting in saving data and preserving programs without corruption.

Prior art equipment and systems designed to provide this supplemental alternating current utilize batteries to provide direct current that is inverted to alternating current. The alternating current produced by this inverted battery power keeps the equipment running, while fault notices coming from power monitors, immediately switch the critical loads into their respective shutdown programs to allow the equipment to later go off-line and shut down in an orderly fashion thereby preserving the equipment, work pieces and computer programs and data. The reason batteries are used as the prime source of power is that inverting direct current to 60 Hertz alternating current from a battery can be accomplished with an inverter.

Unfortunately, battery-powered systems of this type are not popular for a number of reasons. First, batteries require a substantial capital investment that must be maintained by replacing batteries as they wear out, due to usage and just plain old age, usually on the average of every five years. Secondly, batteries are subject to boiling over, exploding, leaking, and other such maladies that require constant maintenance which raises the cost of having them in the power system. In addition, batteries must be located in ambient conditions that include a warm, dry atmosphere and this often requires a controlled environment, including heating and air conditioning equipment, that increases the overall cost of operation. Many manufacturing plants that need this type of protection are located in areas where harsh environmental conditions exist for at least part of the year. In these areas, batteries are not desired because these harsh conditions contribute to their instability and their early demise.

The devices of this small but growing industry are often referred to as Uninterruptible Power Supply (UPS) systems. During an outage, this system, supported by an array of direct current batteries or a flywheel apparatus that replaces the direct current battery array, provides direct current power that is transformed into alternating current and fed into the power grid load for a short period of time, such as for 8 to 20 seconds in order for the critical electric load to undergo an orderly shutdown. Batteries cannot provide sustained power because of their limited capacity. However, in some cases, such as in momentary interruption of commercial power, this battery-powered UPS system will continue the alternating power to the load until commercial power is restored if the interruption is for only for a short duration. In other cases, the UPS system can be modified to provide a prime mover, such as a fossil fuel-driven engine driving an electric generator, to provide continuous alternating current to the load during periods of extended outages. However, in all these cases, batteries are the source of the instantaneous power fed to the load. In addition, these prior art devices are special built and use parts that must be specially ordered and manufactured leading to high costs and long ordering and reordering delays.

Most electrical power grids have similar characteristics when they malfunction, including: sags (alternating current voltage decreases), surges (alternating current voltage increases), transients (alternating current voltage spikes caused by utility load sub-cycle switching), flickers or blinks (sub-second momentary alternating current voltage outage), momentary outages (alternating current voltage loss greater than 1 second) and extended outages (alternating current voltages loss for an undetermined amount of time). An Uninterruptible Power Supply system is designed to protect against all these abnormalities by eliminating the instantaneous loss, sags, or surges or of power (identified as "outage" throughout the balance of this patent application) and substituting it with short-duration power of similar frequency and voltage in order to allow pre-programmed shutdown.

The Uninterruptible Power Supply systems in the prior art are provided in two general designs: First, there is the Static UPS system that utilizes alternating current input and rectifies the electrical power to direct current. This direct current is used to charge the batteries for outage protection and supports the inverter to reconvert the direct current power to alternating current to supply the alternating electrical power for the load. Upon loss of input alternating current, the inverter is continuously supported by the direct current battery system until the battery system is depleted or normal alternating current is restored to the input of the Static UPS system. If the battery system is depleted prior to the restoration of normal alternating current power, the load will experience a loss of power and shutdown.

Second, the Rotary UPS system utilizes an input to support the motor section of the system that rotates an alternating current generator to supply electrical power to the load. The Rotary UPS system may be supported by the following systems to insure outage protection:

U.S. Pat. No. 4,243,598 discloses a direct current motor coupled directly to an alternating current motor and generator to maintain the nominal rotor shaft speed during an outage condition. The direct current motor is supported by a battery system as in the Static UPS system. It may also provide battery support for a Rotary UPS system.

U.S. Pat. No. 4,827,152 discloses a directly coupled hydraulic motor that utilizes a high pressure hydraulic bladder system to maintain rotor shaft speed long enough to allow an engine to start and support the system rotor shaft speed. When normal power is restored, the system will continue to operate on the engine until the hydraulic bladder is replenished and ready for another outage condition.

U.S. Pat. No. 5,811,960 discloses an alternating current generator coupled to a continuous power alternating current motor and further coupled to a flywheel to provide power to the systems internal direct current rectifier to support the rectifier when commercial input alternating current power is removed. The alternating current generator is connected to the rectifier section via a filtering inductor choke assembly that dampens the effects of power fluctuation on the output to the load. The commercial power flow bypasses the rectifier and inverter section. The rectifier and inverter operate in an energized standby mode with no load being supported by this section. Upon commercial power loss to the system, the rectifier is supported by the flywheel source providing direct current power to the inverter until it is replaced with direct current power from the emergency generator to support the inverter. Upon command from the system controller, the system internal inverter will synchronize the alternating current power from its output to the alternate source of the emergency generator and transfer the load from the inverter to the emergency generator. The emergency generator then supplies electrical power to the load until commercial power is restored and then re-transfers to commercial power via the filtering inductor assembly. The flywheel section must now be returned to normal speed via the alternating current drive motor and re-synchronized to the filtering inductor power to get ready for the next outage.

U.S. Pat. No. 4,707,774 discloses a high speed flywheel supported by a source of power provided by an inverter that is unsynchronized to the alternating current input source to support a direct current chopper circuit. The direct current chopper maintains a regulated voltage level of direct current to support the inverter circuit. The inverter circuit supplies the load with regulated and frequency controlled alternating current. Outage protection is supplied as long as the flywheel can provide electrical power to support the chopper or an alternating current source can restored to the input of the system.

SUMMARY OF THE INVENTION

The present invention provides a simple and effective solution to protect critical electric equipment and loads during momentary electrical power outages without the use and disadvantages of batteries. The incorporation of a flywheel and the advancements in technologies allow operation of the electrical equipment supported by this system without the disadvantages of batteries, such as their extremely short life, their propensity to leak, corrode or otherwise deteriorate, and the significant cost associated with replacing worn batteries.

In reference to the prior art, this novel system provides alternating current voltage regulation to critical electrical equipment. In one embodiment, this novel system provides alternating current voltage regulation to non-critical as well as critical electrical equipment. It is a simple approach to solving momentary commercial alternating current power outages and the return-to-normal operation is enhanced by alternating current power factor correcting that augments the reliability and efficiency of the electrical equipment supported.

In its simplest form, the invention is an emergency supplemental power supply for outage protection of critical electric loads powered from a commercial power grid, including a variable speed drive receiving power from the commercial grid, an asynchronous motor powered from the variable speed drive for turning a fly-wheel attached thereto to build and maintain a level of expendable kinetic energy in the fly-wheel, a coupling of the fly-wheel to a synchronous alternating current generator, for driving the generator in a no-load, standby condition slightly above the frequency of the commercial power on the grid and in a ready condition for input to the critical equipment load, a computer processor, in the form of a programmable logic controller (PLC) interconnected the variable speed drive, the synchronous alternating current generator, and a normally-open interrupt contactor for maintaining the supplemental power ready for immediate use upon interruption of the commercial electric power and to allow the kinetic energy in the rotating fly-wheel to drive the synchronous alternating current generator, without further input power from the variable speed drive or the synchronous motor, and produce a regulated alternating current voltage at a controlled frequency from the synchronous alternating current generator to the load. The spinning fly-wheel spins down while passing its mechanical kinetic energy into the generator to be converted to alternating electrical current for passing to the critical load. Even though the fly-wheel and, hence, the synchronous alternating current generator, are spinning down, the frequency and the voltage are rigidly controlled at specified numbers until the spinning gets so slow that the entire unit drops out of the circuit.

When this embodiment is incorporated with a variable speed drive and motor generator, a rotary un-interruptible power supply is created. The above-described embodiment may also be coupled with a fossil fuel engine to provide unlimited critical load protection.

Accordingly, the main object of this invention is a supplemental power source that eliminates the use of conventional batteries in outage protection. The combination of the flywheel and an alternating current generator produces high current demands for short periods of time, allowing either sufficient time for the return of normal commercial alternating current power, or for transfer of the input source from commercial power to the emergency generator set, via an automatic transfer switch, to provide outage protection for a period that provides a logical and safe shutdown of equipment.

Other objects of the invention include reduced alternating current power consumption during ride-through-module startup that is accomplished by using an integrated variable speed drive (VSD) to support an asynchronous support motor; an integrated variable speed drive that is provided as a self-sufficient part of the system and sized for the alternating current asynchronous motor which is to be supported; a variable speed drive used to start and maintain operational speed of the flywheel and generator used to provide outage protection power; a system where the operational speed in the maximum ride-through-mode is faster than 60 Hertz and the generator will be inhibited from connection to commercial power. This invention is designed such that the variable speed drive that operates the support motor will remain on until there is a power outage. Still further, the flywheel, bearings and coupling device of this invention can be sized for the power required to support the specific load for which the invention is designed to protect and are off-the-shelf items that can be readily obtained without special order. The flywheel of this invention is designed for continuous operation without failure or bursting. The amount of protection time from outages is determined by the flywheel kinetic energy based on mass and operational speed. The invention's versatility is provided by the ability to support either the internal variable speed drive or other existing variable speed drives that are already in place within a facility. It can also support critical alternating current electric loads and frequency tolerant alternating current resistive loads. The invention has the ability to transfer load when programmed in conjunction with an emergency power generator to route the load through the integrated variable speed drive thus replacing the power provided by the kinetic energy of the flywheel and continue operation without interruption to the load.

In another embodiment of this invention, the system has the ability to incorporate an internal load-rated variable speed drive that will support a motor generator. The motor generator can be built into the package, provided separately or be already existing. This capability allows for upgrading of existing equipment to provide outage protection. The invention can also be used to support pump or fan motors, electrical process motors and other components.

In still another embodiment of this invention, the system has enhanced capabilities to support an integrated motor generator that is coupled via a overriding clutch to a prime mover such as a reciprocating engine. This embodiment allows for continuous outage protection without affecting the supported load and allows for the flywheel portion to return to normal operation while the load is being supported externally. Conventional flywheel-based systems incorporate many more components in comparison to the invention presented. This invention has decreased parts count (less parts) and the non-reproduction of electrical power offers an economical, more efficient and simple approach to solving momentary outage problems.

In even another embodiment of this invention, an alternating current ride-through module comprises an alternating current asynchronous motor, an alternating current generator, a flywheel, an integrated coupling device, a variable speed drive, a system monitoring/controller and associated switching devices. To fully encompass all power quality deviations, a motor generator, overriding clutch and engine are also required. This invention provides a total approach to supporting loads that are either frequency tolerant, variable speed drive driven and supported by the duration of the kinetic energy provided by the flywheel, or enhanced with the addition of an engine with overriding clutch.

The use of the invention will provide outage protection from a renewable power source without the use of conventional batteries. This eliminates the routine of capacity check for batteries and replacement problems that occur with disposal of hazardous material. The invention also allows for an environment that does not have the critical requirements of batteries. Operation of the equipment in normal earth ambience without any sign of deviation in power capacity or capability, thus eliminating required air conditioning and refrigeration hazards. The use of alternating current rather than direct current prevents safety risks associated with high voltage direct current. This also eases the installation process of the equipment due to direct current hazards.

These and other objects of the invention will become more clear when one reads the following specification, taken together with the drawings that are attached hereto. The scope of protection sought by the inventors may be gleaned from a fair reading of the Claims that conclude this specification.

BRIEF DESCRIPTION OF THE DRAWINGS

FIG. 2 is a graph showing the frequency and voltage to the load from the embodiment of the invention shown in FIG. 1 after implementation of the outage protection of this invention following a commercial power outage;

FIG. 4 is a graph showing the frequency and voltage to the load from the embodiment of the invention shown in FIG. 3 after implementation of the outage protection of this invention following a commercial power outage;

FIG. 7 is a graph showing the frequency and voltage to the load from the embodiment of the invention shown in FIG. 5 after implementation of the sag and outage protection of this invention following a commercial power outage;

FIG. 8 is a graph showing the frequency and voltage to the load from the embodiment of the invention shown in FIG. 6 following a commercial power outage;

DESCRIPTION OF THE PREFERRED EMBODIMENT

Figure 1:
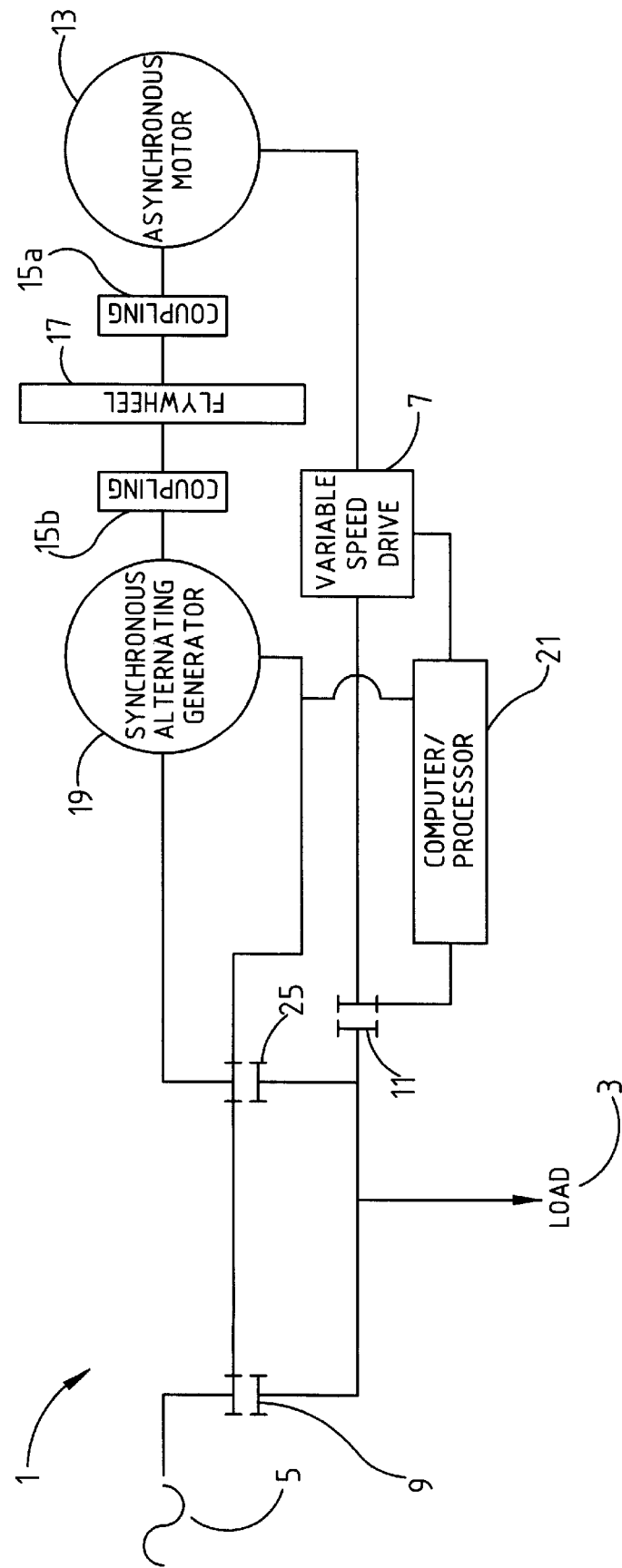
FIG. 1 is a one-line schematic showing the basic embodiment of the invention.

Turning now to the drawings, where elements are identified by numerals and like elements are identified by like numerals throughout the thirteen figures, FIG. 1 shows the basic embodiment of the invention 1 of an emergency supplemental power supply for outage protection of critical electrical equipment, generally termed a "load" 3, such as molding machinery, metal lathes, computer-controlled metal forming equipment, computers and the like, powered from a commercial power grid 5 such as 60 Hertz and 120/240 or 240/480 volts, and shows a variable speed drive 7 with input from commercial power grid 5 in parallel with the critical electric equipment load 3 through a first grid input interrupt contactor 9, interposed power grid 5 and load 3, and a second interrupt contactor 11 that remains closed during commercial power input to load 3 and that opens automatically during sags, spikes, or other interruption of the commercial power.

Variable speed drive 7 contains a rectifier device, that transforms alternating (cyclic) commercial current to direct current, and an inverter, that transforms the direct current back into alternating current. Controls are provided on variable speed drive 7 to insure the output alternating current is of a certain frequency. An example of a variable speed drive useful in this invention is a 10 horsepower rated, 480 Volt AC, 3-phase, 60 Hertz drive manufactured by Danfoss, Inc. of Rockford, Ill. It is necessary to size each variable speed drive for the specific use intended.

Interrupt contactors 9 and 11 are protective devices that will open with a few micro-seconds following a commercial power outage. They are used in this invention to isolate load 3 from commercial power grid 5 immediately following the outage and to isolate variable speed drive 7 from load 3 thus allowing the entrance of invention 1. An example of an interrupt contactor useful herein is a 100 horsepower rated, 480 Volt AC, 3-phase, 60 Hertz contactor made by Sprecher & Shuh, of Houston, Tex. Sizing of interrupt contactors 9 and 11 is absolutely necessary to insure successful operation of the invention.

An asynchronous motor 13 is provided, connected to variable speed drive 7, and powered therefrom having an output shaft (not shown) connected through a first coupling 15a to a fly-wheel 17 for turning said fly-wheel 17 from power received from commercial power grid 5, to build and maintain a level of expendable kinetic energy in said rotating fly-wheel 17. An example of an asynchronous motor useful herein is a 10 horsepower rated, 480 Volt AC, 3-phase, 60 Hertz motor made by Marathon, Inc. of Wausau, Wis. There are a number of such motors on the market and choosing the proper one for the specific size of invention (in relation to load 3) is vitally necessary. Coupling 15a may be a rubber-based coupling. An example of coupling 15a useful herein is Para-Flex Px-120 made by Dodge Coupling, of Detroit, Mich.

Fly-wheel 17 may be small, large, or of a variety of designs and be thin, thick and made from a variety of materials. It will turn in the neighborhood of 2,400 rpm and, thus, must be made from high-grade steel or the like in order to reduce the chances of a possible explosion due to centrifugal force developed during rotation. The design of fly-wheel 17 will depend upon the size of critical electrical equipment load 3 and other factors such as the size and power requirements of the various pieces of equipment that make up this invention. An example of fly-wheel 17 useful herein is a 650 pound fly-wheel made by McKee's Rocks Forging, Inc. of McKees Rocks, Pa.

Fly-wheel 17 is connected through a coupling 15b to a synchronous alternating current generator 19 so that fly-wheel 17 can drive generator 19 in a no-load, standby condition. Coupling 15b may take the form of many such clutch-type couplings available on the market. Coupling 15b must be sized to handle the load from fly-wheel 17. Research has concluded that only a small amount of electrical power, such as 5 amps, need be drawn from the power grid in order to support the rotation of fly-wheel 17 through variable speed drive 7. An example of a synchronous alternating current generator for use herein is a K-Mag 14 Series Generator made by Kato Engineering. The size and capability of generator 19 depends upon the size of load 3 and other factors. Because generator 19 does not feed a load when commercial power is applied to load 3, it requires a minimum self-excited electrical supply to establish a no-load, synchronized, standby condition.

A computer processor or programmable logic controller 21 is interconnected variable speed drive 7 and synchronous alternating current generator 19 for controlling the operation of invention 1. In controlling invention 1, processor/controller 21 calls for asynchronous motor 13 to be powered, called "ramping up", to turn fly-wheel 17 at a speed that causes alternating current generator 19 to produce a 3-phase, alternating current with commercial power, at the voltage required by load 3, and at a frequency slightly above that of the commercial power grid, such as about 75 Hertz. Variable speed drive 7 also maintains fly-wheel 17 at the required speed so that the frequency of alternating current output from generator 19 in a ready condition for input to critical equipment load 3. An example of a computer processor useful herein is a Micro 3 PLC made by IDEC. The characteristics desired in a useful computer processor must be matched to the size of load 3 and other factors.

A third interrupt contactor 25 is provided, interposed generator 19 and load 3, and controlled by computer/processor 21. When commercial power or whatever main source of power being used suffers an outage, both first interrupt contactor 9 and second interrupt contactor 11 react almost immediately and open to isolate load 3 from the commercial power line and variable speed drive 7 from generator 19. Computer processor 21 simultaneously (in a few micro-seconds) closes interrupt contactor 25 so that power interruption is nothing more than a "blip" on the graph of power supplied to load 3. An example of third interrupt contactor 25 useful herein is 100 horsepower rated, 480 Volt AC, 3 phase, 60 Hertz made by Sprecher & Shuh, of Houston, Tex. Interrupt contactor 25 should be sized to handle the expected load from generator 19.

The kinefic energy in rotating fly-wheel 17 is then coupled through coupling 15b to drive synchronous alternating current generator 19 and produce a regulated alternating current voltage with decaying frequency from generator 19 to load 3. This is accomplished without further input power from variable speed drive 7 or from asynchronous motor 13 because the commercial power that drives them is now interrupted. The reason the frequency is decaying is that fly-wheel 17 loses drive power from motor 13, as soon as commercial power is interrupted, and begins to spin down, and delivers, from generator 19, a packet of electrical power to allow the equipment in load 3 to shut down. This embodiment is useful when connecting the invention through a variable speed drive (not shown) provided by the customer or already in the commercial power loop.

FIG. 2 is a graph showing the frequency and voltage to load 3 from the embodiment of the invention shown in FIG. 1 after implementation of the outage protection of this invention following a commercial power outage. The abscissa of FIG. 2 is time in seconds and begins at –2 wherein the length from –2 to 0 shows the input of commercial power from grid 5 and the length from 0 to 22 is the number of seconds immediately following the onset of emergency supplemental power from invention 1. FIG. 2 shows, in solid line, the jump from 60 Hertz to 75 Hertz that is accomplished by running fly-wheel 17 at a speed sufficient to turn synchronous alternating current generator 19 at a speed to obtain this amount of frequency. Note that voltage (the dotted line) in FIG. 2 does not waiver except for the small blip at 0 seconds which is caused by the rapid opening of first and second interrupt contactors 9 and 11 and the closing of interrupt contactor 25.

As fly-wheel 17 turns synchronous alternating current generator 19, it gives up its kinetic energy to generator 19 and, in the process, begins to slow down. As it slows down, the frequency drops off, as shown in FIG. 2, and, when the frequency reaches about 40 Hertz (in a 60 Hertz powered load), the system collapses into a shut down mode. Note that this collapse is reached only after about 20 seconds thus providing critical load 3 with sufficient time to engage and complete its own programmed shutdown procedures.

Note also that during this 20-second supplemental power process, the voltage, measured on the right ordinate, remains at an unchangeable 220 volts A.C. Thus, in this embodiment, following a commercial power outage, the frequency varies while the voltage applied to load 3 remains substantially unchanged. The term "substantially" is used to take into account the slight "blip" at the onset of the commercial power outage.

As previously described, the importance of this invention is to provide instantaneous supplemental power, following the failure of commercial power, for a period in which critical electrical equipment can pass into a shut-down mode to protect the equipment and save their work pieces on which they are operating at the moment of commercial power interruption. It has been estimated that this period may vary from 8 to about 20 seconds for most electric equipment that requires most of the attention. However, depending upon the load on the grid and the equipment peculiarities, this period may require extension to beyond 20 seconds. Accordingly, this invention is easily modifiable to extend such period, mainly by increasing the amount of kinetic energy stored by fly-wheel 17. In other cases, the period may be increased by immediately cutting off other, non-essential electric loads such as lights, heaters, and the like.

Figure 3:
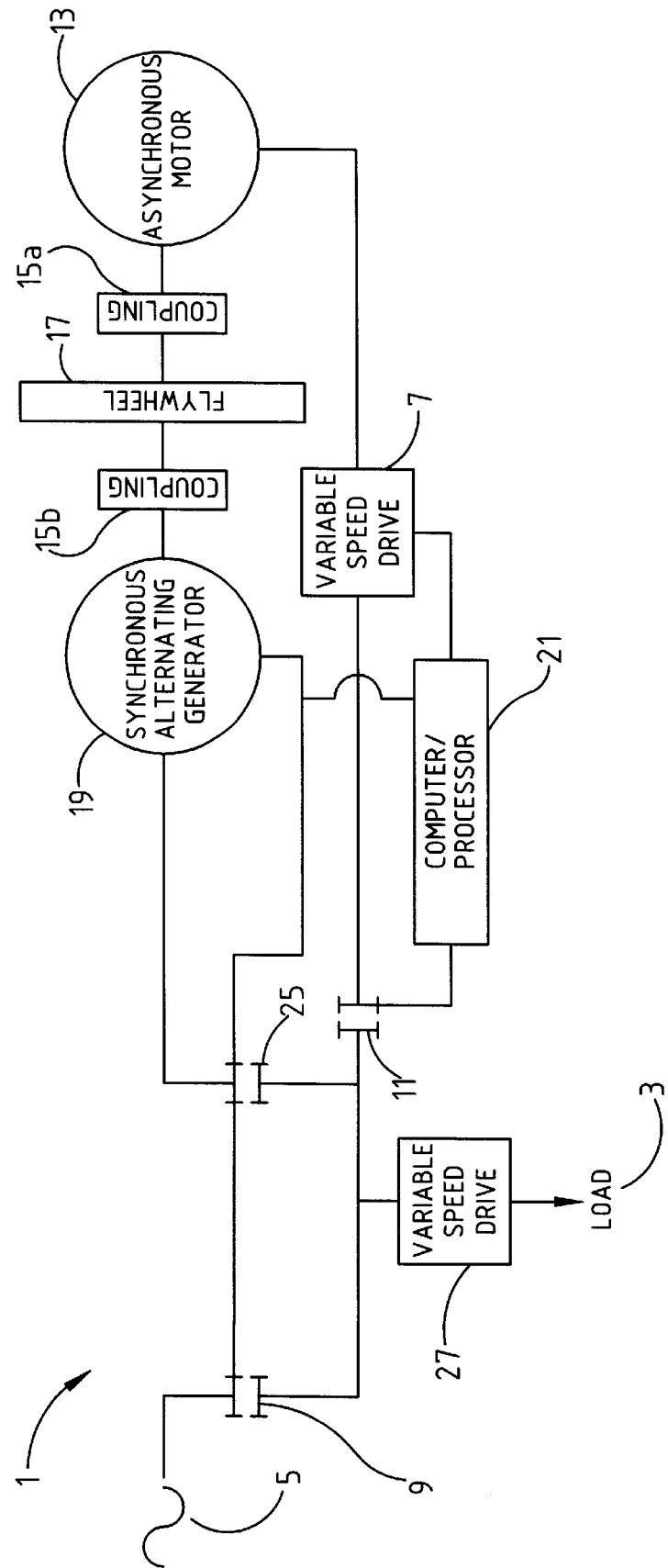
FIG. 3 is a one-line schematic showing another embodiment of the invention shown in FIG. 1 utilizing a second variable speed drive to provide further control of the frequency to the load.

In another embodiment of this invention, as shown in FIG. 3, emergency supplemental power supply 1 may include a second variable speed drive 27 interposed interrupt contactor 25 and load 3. Second variable speed drive 27 rectifies the incoming alternating current, from synchronous alternating current generator 19, to direct current and then inverts the direct current to a frequency-specific alternating current for powering the critical electric equipment load.

FIG. 4 shows the effect of interposing second variable speed drive 27 between generator 19 and load 3. Variable speed drive 27 forms the frequency of the alternating current of the supplemental power at 60 Hertz so that there is no initial increase of frequency or a gradual tapering off thereof as shown in FIG. 1. By this means, more accuracy is placed on the alternating current passing into load 3 and the specific alternating current remains somewhat longer at the appropriate frequency, such as 60 Hertz, before decaying due to the slowing of the spinning fly-wheel 17. In this embodiment second variable speed drive 27 obtains commercial power from commercial power grid 5 during normal operations of commercial power. This embodiment provides more accurate supplemental power than does the embodiment shown in FIG. 1.

Figure 5:
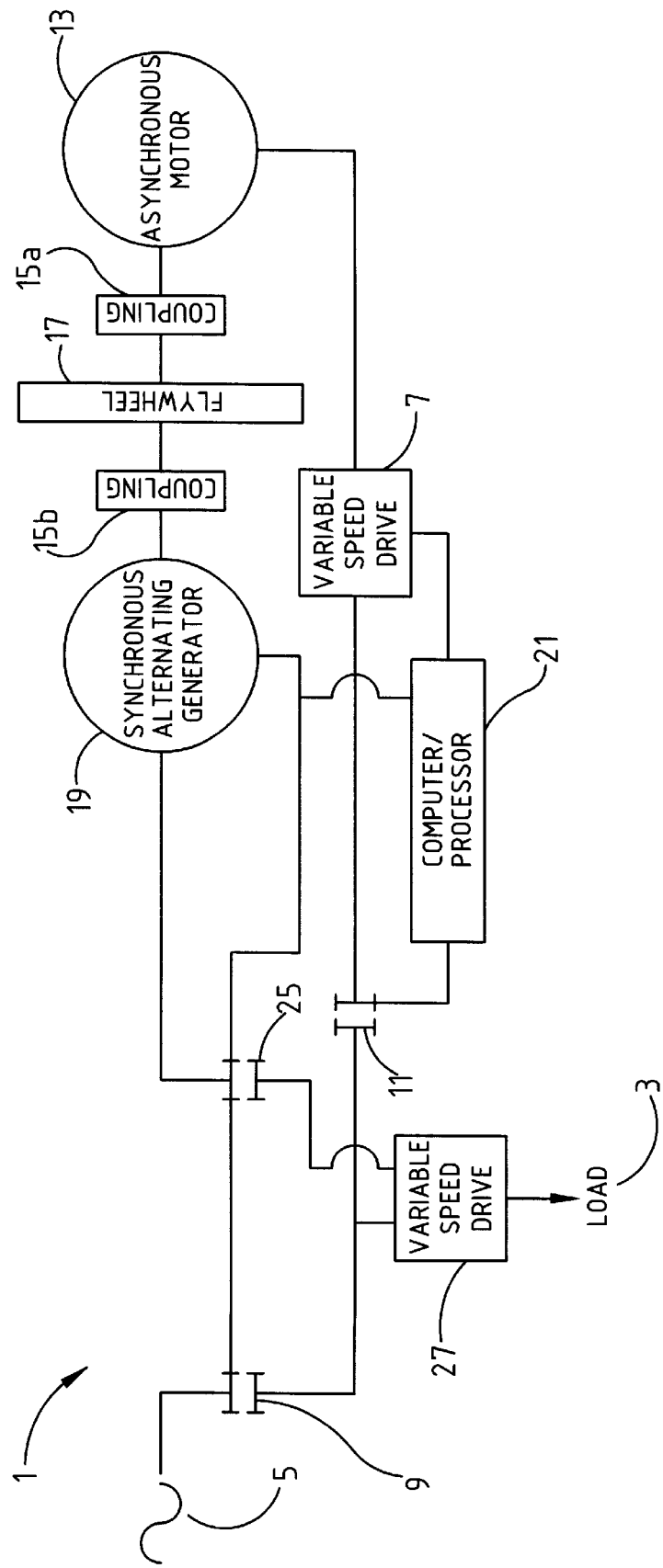
FIG. 5 is a one-line schematic showing another embodiment of the invention shown in FIG. 3 wherein the second variable speed drive has separate inputs from the commercial power grid and the synchronous alternating current generator to the variable speed drive to provide sag protection as well as eliminating the "blip" between commercial power outage and outage protection from this invention.

In a still further embodiment of emergency supplemental power supply 1 for outage protection of critical electric equipment load 3, powered from commercial power grid 5, is shown in FIG. 5. Here, the feed lines from grid 5 to second variable speed drive 27 and from synchronous generator 19 (through second interrupt contactor 25) to second variable speed drive 27 are totally separated. This embodiment is significant when dealing with momentary drops in frequency and/or current from commercial power grid 5. These are called "sags" and may cause certain electric equipment to drop off line and become damaged due to freeze-up of materials being operated upon by the equipment. The separate inputs from commercial power grid 5 and synchronous generator 19 allow fly-wheel 17 to provide power to synchronous generator 19 and provide synchronized supplemental power through interrupt contactor 25 during these momentary sags. The electrical characteristics of this embodiment are shown in FIG. 4 and are the same as shown in the embodiment shown in FIG. 3. However, both the alternating power coming from variable speed drive 27, in the embodiments shown in FIGS. 3 and 5, is not "pure" alternating power. Alternating current manufactured by a variable speed drive contains areas of non-sinusoidal waves caused by the characteristics of the transistors and other elements inside the drive and is statically manufactured, non-sinusoidal as shown in FIG. 7.

Figure 6:
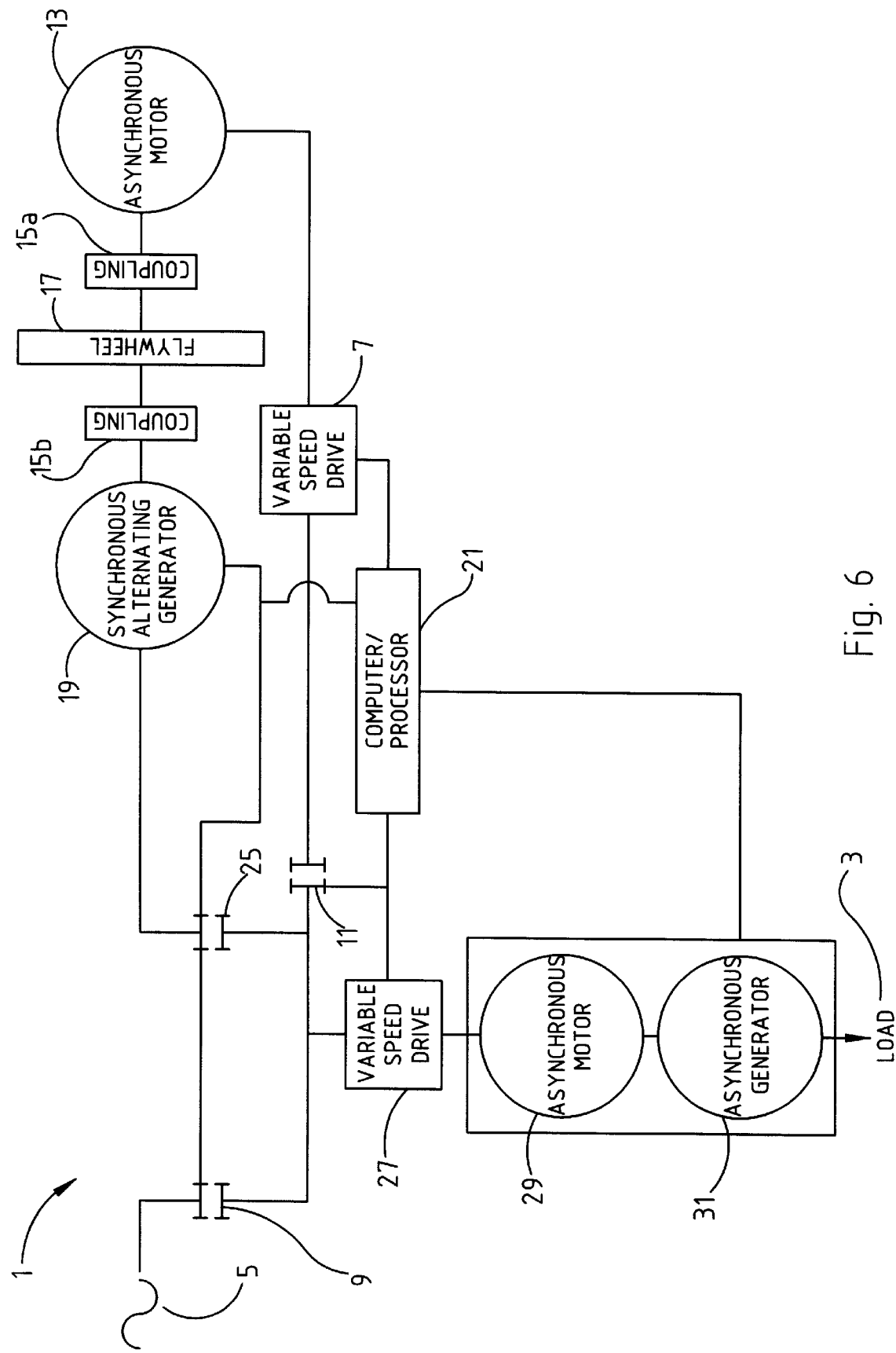
FIG. 6 is a one-line schematic of another embodiment of the invention shown in FIG. 5 wherein the second variable speed drive is coupled with an additional asynchronous motor/synchronous alternating current generator added to provide clean conditioned power with total isolation from commercial power.

In a still further embodiment of invention 1, shown in FIG. 6, a second variable speed drive 27 is provided as before, interposed commercial power grid 5 and critical electric equipment load 3 and a second asynchronous motor 29, coupled to a second synchronous generator 31, in combination, known as a "motor-generator set", is interposed second variable speed drive 27 and critical electric equipment load 3. Computer processor control means 21 is interconnected both first and second variable speed drives 7 and 27, synchronous alternating current generator 19, second asynchronous motor/second synchronous generator combination 29/31, and interrupt contactor 25, this time for not only maintaining the frequency of alternating current and voltage output from synchronous alternating current generator 19 in a ready condition for input to said second variable speed drive 27. Second asynchronous motor/second synchronous generator combination 29/31 provides such improved power. This improved alternating power, shown in FIG. 8, generally known as "clean conditioned power with total isolation from utility power", can handle computer-operated equipment and other critical equipment that requires more accuracy in the alternating current passing into load 3.

Figure 9:
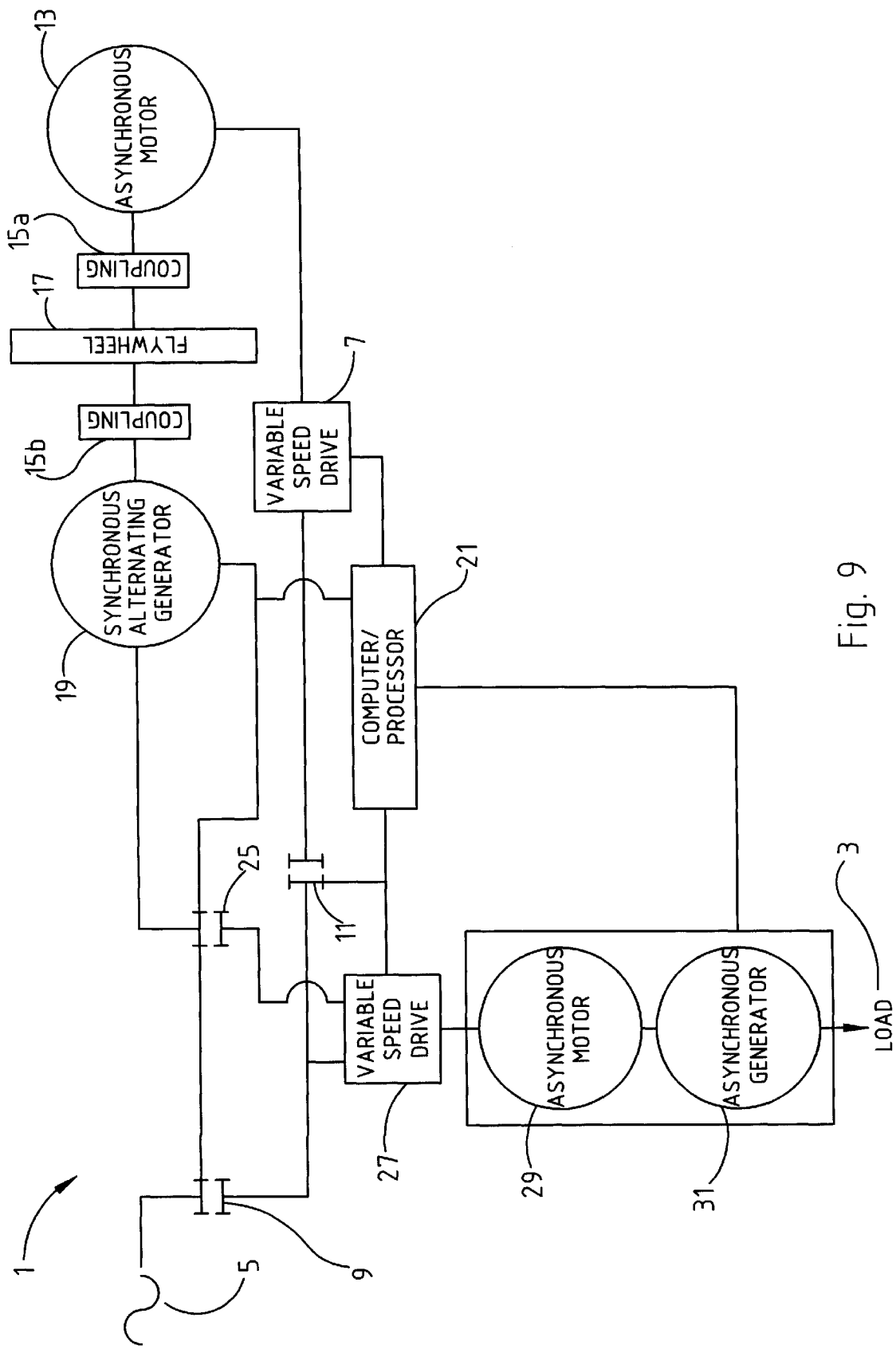
FIG. 9 is a one-line schematic of another embodiment of the invention shown in FIG. 6 wherein the second variable speed drive has separate inputs from the commercial power grid and the synchronous alternating current generator to provide clean conditioned power with total isolation from commercial power following a commercial power sag or outage.

In a still further embodiment of invention 1, shown in FIG. 9, second variable speed drive 27 is provided as before, interposed commercial power grid 5 and critical electric equipment load 3 and second asynchronous motor 29, coupled to a second synchronous generator 31, the "motor-generator set", is interposed second variable speed drive 27 and critical electric equipment load 3. Computer processor control means 21 is interconnected both first and second variable speed drives 7 and 27, synchronous alternating current generator 19, second asynchronous motor/second synchronous generator combination 29/31, and interrupt contactor 25. In addition, the feed lines from commercial power grid 5 to second variable speed drive 27 and from synchronous generator 19 (through interrupt contactor 25) to second variable speed drive 27 are totally separated and independent of each other. This embodiment not only maintains the frequency of alternating current and voltage output from synchronous alternating current generator 19 in a ready condition for input to said second variable speed drive, but it provides a more pure form of sinusoidal wave alternating power, such as is shown in FIG. 8. In addition, the dual inputs provide less strain on variable speed drive 27 than a single input feed line.

Figure 10:
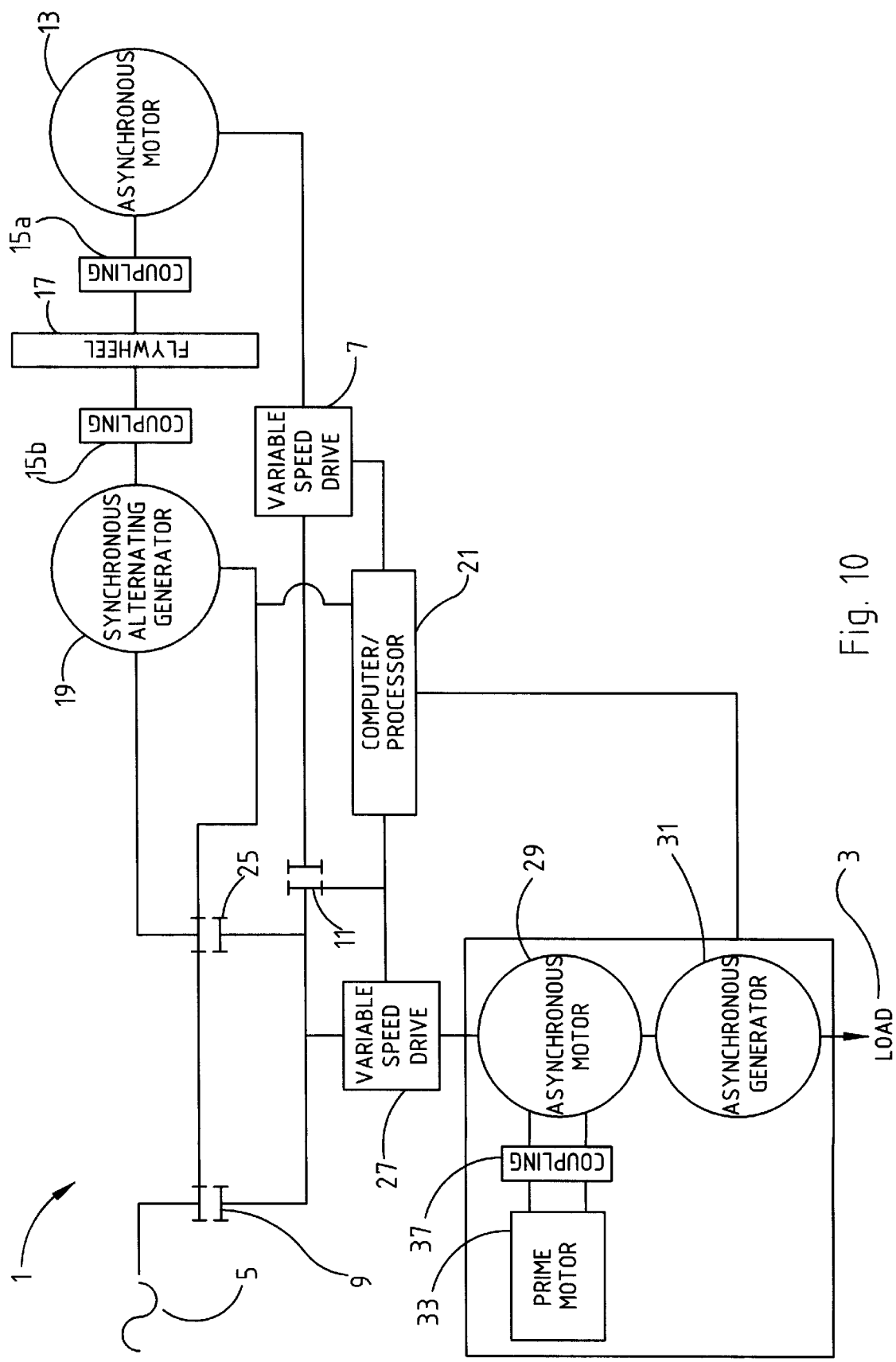
FIG. 10 is a one-line schematic of another embodiment of the invention shown in FIG. 9 with the addition of a prime mover coupled to the asynchronous motor/synchronous alternating current generator combination to provide sustained power following a commercial power sag or outage.
Figure 11:
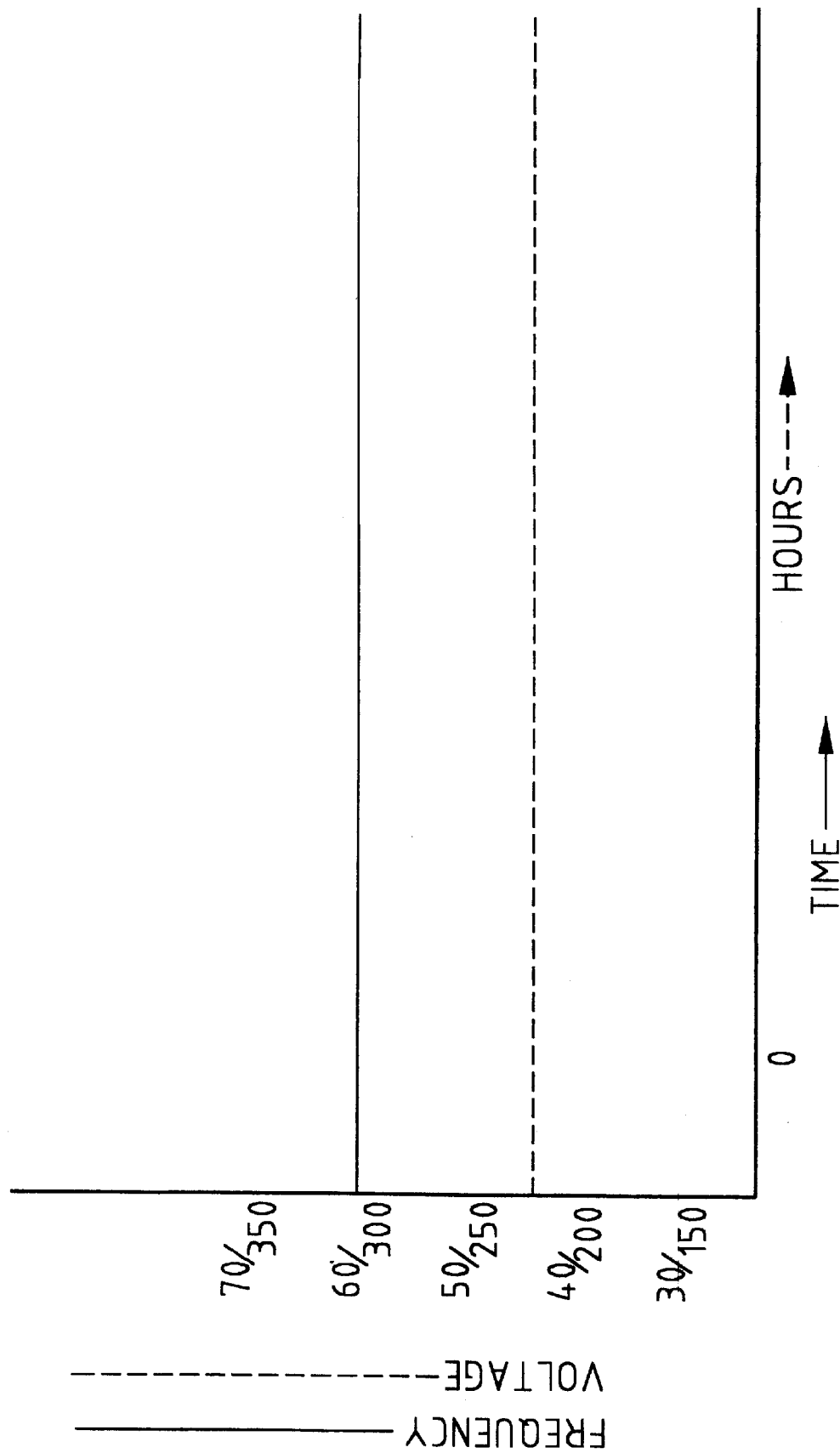
FIG. 11 is a graph showing the frequency and voltage to the load from the embodiment of the invention shown in FIG. 10 following a commercial power sag or outage.

In another embodiment of the invention, shown in FIG. 10, second asynchronous motor 29 is again coupled to second synchronous generator 31, in combination, and interposed second variable speed drive 27 and critical electric equipment load 3. A prime mover 33, such as a gasolene-powered or diesel-powered internal combustion engine, is provided, including a coupling 37 for coupling prime mover 33 to second asynchronous motor/second synchronous generator combination 29/31. An example of a prime mover useful herein is a 50 HP Diesel engine made by Perkins Engines from the United Kingdom. The exact size of such a prime mover is determined from a number of variables, such as the size of load 3, etc. Under operation of computer processor 21, contactor 25 is caused to close upon the interruption of incoming grid power 5 to load 3, to allow the kinetic energy in rotating fly-wheel 17 to drive first synchronous alternating current generator 19 and produce an alternating current voltage and frequency from synchronous alternating current generator 19 to second variable speed drive 27, for supplementing the sag or outage from the commercial power grid to the load, for a period sufficient to allow prime mover 33 to start and come up to a speed necessary to couple through coupling 37 to second asynchronous motor 29 and provide lasting supplemental power to the critical load as shown in FIG. 11.

Figure 12:
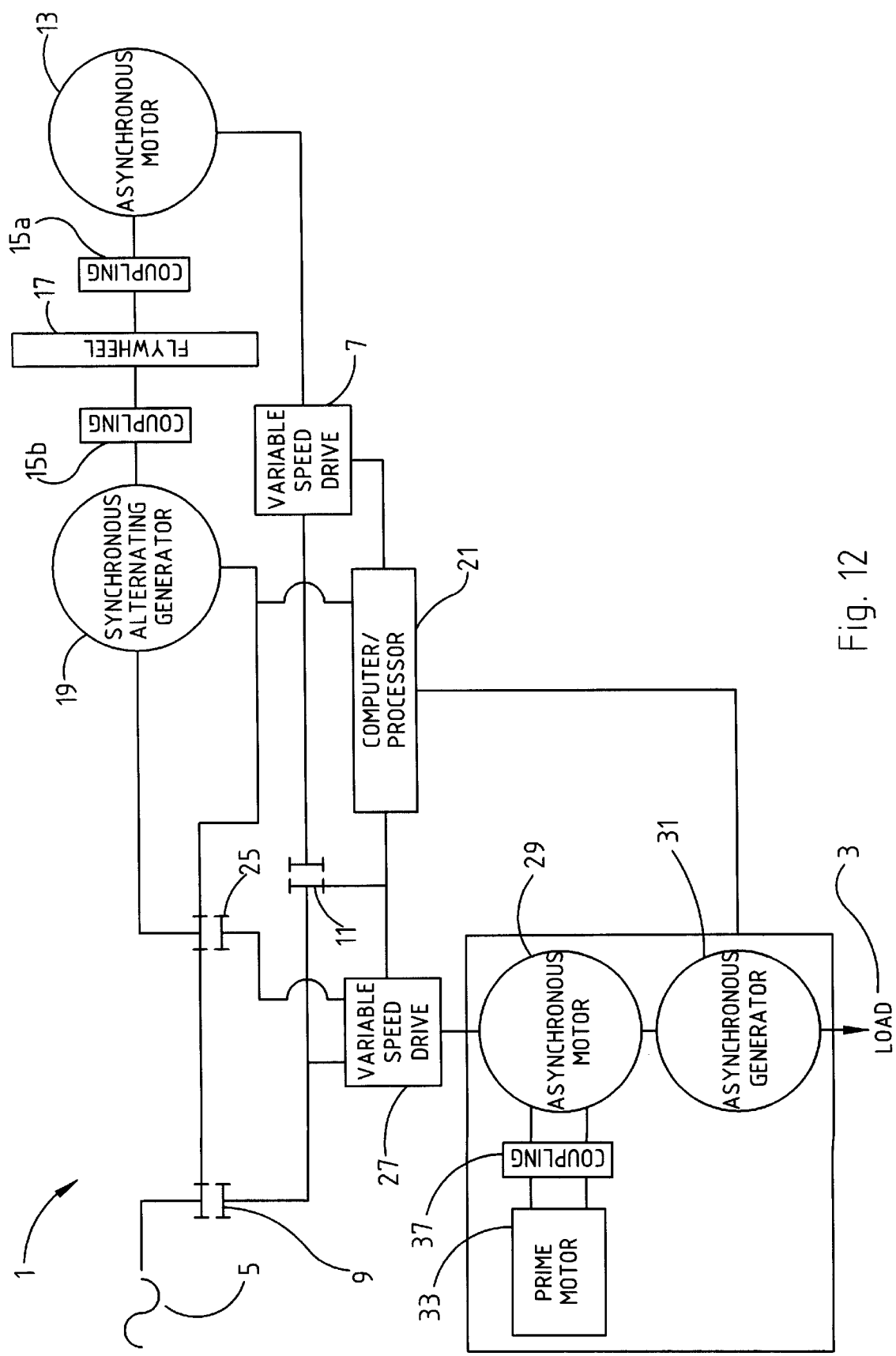
FIG. 12 is a one-line schematic of another embodiment of the invention shown in FIG. 10 wherein the second variable speed drive has separate inputs from the commercial power grid and the synchronous alternating current generator to provide clean condition power with total isolation from commercial power following a commercial power sag or outage; and, FIG. 13 is a one-line schematic of another embodiment of the invention shown in FIG. 12 wherein the second variable speed drive has separate inputs from the commercial power grid, the synchronous alternating current generator is coupled to the first synchronous alternating current generator to provide clean condition power with total isolation from commercial power following a commercial power sag or outage, and an automatic transfer switch is provided with the first synchronous alternating current generator to provide supplementary power to a non-critical second load.

A modification to the embodiment of the invention shown in FIG. 10 is shown in FIG. 12 wherein the input feed lines from grid 5 to second variable speed drive 27 and from synchronous generator 19 (through interrupt contactor 25) to second variable speed drive 27 are totally separated. This embodiment provides less tension on variable speed drive 27 as previously described.

Figure 13:
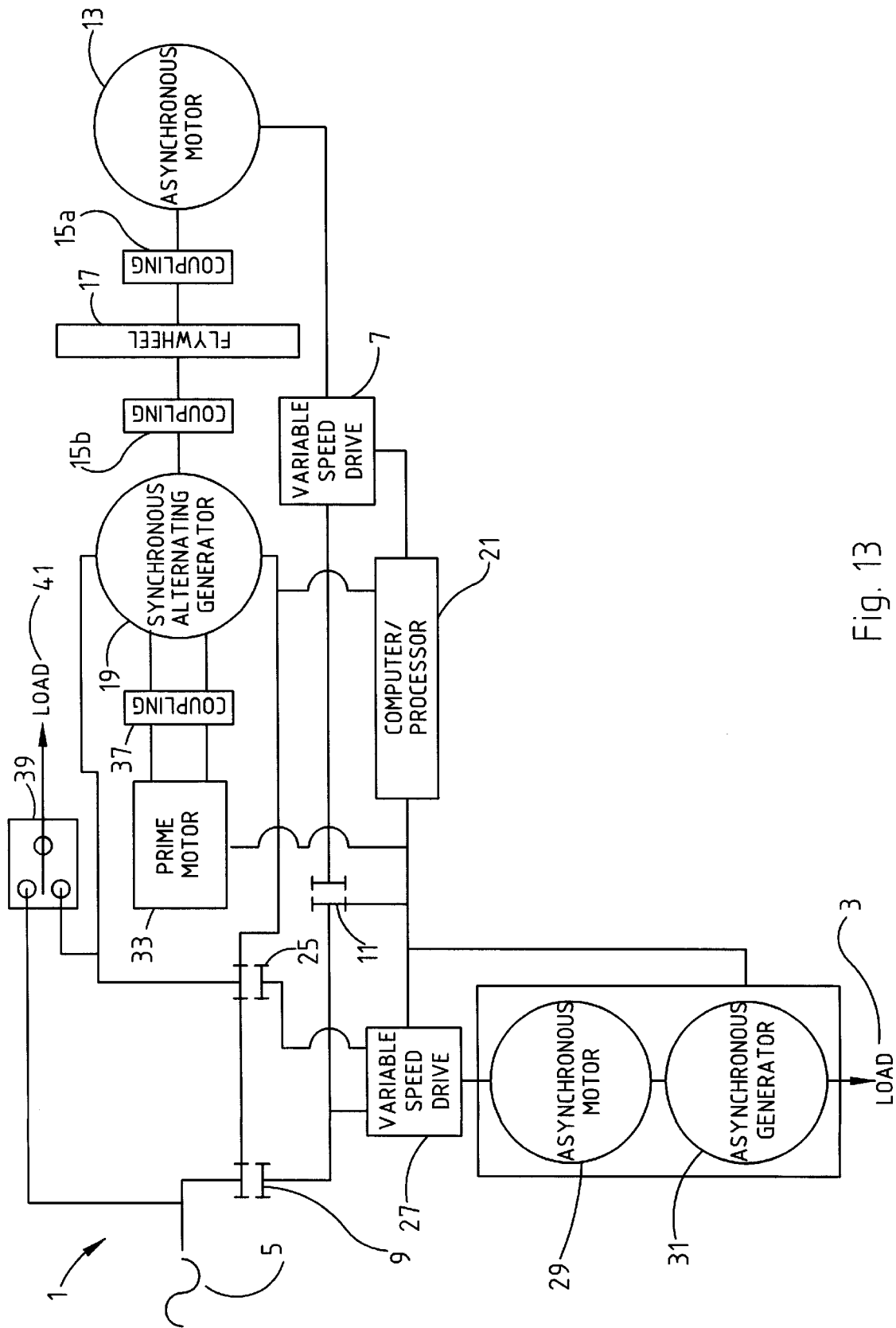

A final embodiment of this invention is shown in FIG. 13 and shows prime mover 33 coupled to synchronous alternating current generator 19 through coupling 37, separate input feed lines into second variable speed drive 27, to deal with sags and reduce the shock load to drive 27, and motor/generator set 29/31 interposed second variable speed drive 27 and load 3 to condition the supplemental alternating power to load 3. In this embodiment, prime mover is coupled to synchronous alternating current generator 19 and sized to produce more power than is needed by load 3. An automatic transfer switch 39 is provided having one incoming leg attached to commercial power grid 5, another incoming leg attached to the supplemental power line passing from synchronous alternating current generator 19 to interrupt contactor 25 and a third leg leading to a second load 41. Switch 39 is biased toward receiving commercial power from grid 5 and will provide this commercial power to load 41 which is preferably made up of non-critical loads such as resistive loads like heaters and lights. Upon an outage of commercial power in grid 5, switch 39 immediately switches to invention 1 and receives power from alternating current generator 19 while critical load 3 receives the same power, however it is conditioned through motor/generator combination 29/31 to provide clean condition power which is totally isolated from utility or commercial power. Fly-wheel 17 provides the initial power, so that there is no interruption to either load 3 or load 41, while prime mover 33 is started and brought up to speed to begin to power synchronous alternating current generator 19 to provide lasting power to both load 3 and load 41.

While the invention has been described with reference to a particular embodiment thereof, those skilled in the art will be able to make various modifications to the described embodiment of the invention without departing from the true spirit and scope thereof. It is intended that all combinations of elements and steps which perform substantially the same function in substantially the same way to achieve substantially the same results are within the scope of this invention.

What is claimed is:

1. An emergency supplemental power supply for outage protection of critical electric equipment load powered from a commercial power grid, comprising:

a) a variable speed drive with input from said commercial power grid in parallel with the critical electric equipment load;

b) an asynchronous motor powered from said variable speed drive for turning a fly-wheel attached thereto to build and maintain a level of expendable kinetic energy in said fly-wheel;

c) means for coupling said fly-wheel to a synchronous alternating current generator for driving said generator in a no-load, standby condition;

d) first and second normally-closed commercial power contactors, for opening and isolating the commercial power grid and for opening and isolating said variable speed drive upon commercial power interruption, and a third normally-open interrupt contactor;

e) a computer processor controller interconnected said first, second, and third contactors, said variable speed drive, and said synchronous alternating current generator, for maintaining the frequency of alternating current output from said synchronous alternating current generator slightly above the frequency of the commercial power on the grid and in a ready condition for input to the critical electric equipment load;

f) said third interrupt contactor, interposed the output of said synchronous alternating current generator and the critical electric equipment load, arrange to close upon interruption of the commercial electric power and opening of said first and second contactors, to allow the kinetic energy in said rotating fly-wheel to drive said synchronous alternating current generator, without further input power from said variable speed drive or said synchronous motor, and pass a regulated alternating current and voltage and a decaying frequency from said synchronous alternating current generator to the load.

2. The emergency supplemental power supply for outage protection of critical electric equipment load powered from a commercial power grid of claim 1 wherein said first and said second normally-closed commercial power contactors remain closed and said third interrupt contactor remains open during commercial power input to the load.

3. The emergency supplemental power supply for outage protection of critical electric equipment load powered from a commercial power grid of claim 1 wherein said fly-wheel includes a fly-wheel loading of kinetic energy sufficient for the appropriate synchronous alternating current generator to power the critical electric equipment load for a time period needed for an orderly shutdown of the critical equipment upon commercial power outage.

4. The emergency supplemental power supply for outage protection of critical electric equipment load powered from a commercial power grid of claim 1 wherein said means for coupling said asynchronous motor to said fly-wheel and said means for coupling said fly-wheel to said synchronous alternating current generator include at least one clutch.

5. The emergency supplemental power supply for outage protection of critical electric equipment load powered from a commercial power grid of claim 1 further including a second variable speed drive interposed said first and said second normally-closed commercial power contactors and the critical electric equipment load for rectifying the incoming alternating current, from the commercial power grid or said synchronous alternating current generator, to direct current and then inverting the direct current to a frequency-specific alternating current for powering the critical electric equipment load.

6. The emergency supplemental power supply for outage protection of critical electric equipment load powered from a commercial power grid of claim 5 wherein said second variable speed drive obtains commercial power from the grid during normal operations of commercial power.

7. An emergency supplemental power supply for outage protection of critical electric equipment load powered from a commercial power grid, comprising:

a) a first variable speed drive with input from said commercial power grid;

b) a second variable speed drive interposed in series with the commercial power grid and the critical electric equipment load;

c) an asynchronous motor powered from said first variable speed drive for tuning a fly-wheel attached thereto to build and maintain a level of expendable kinetic energy in said fly-wheel;

d) means for coupling said fly-wheel to a synchronous alternating current generator for driving said generator in a no-load, standby condition;

e) first and second normally-closed commercial power contactors, for opening and isolating the commercial power grid and for opening and isolating said first variable speed drive upon commercial power interruption, and a third, normally-open interrupt contactor;

f) a computer processor controller interconnected said first, second, and third contactors, said first variable speed drive, and said synchronous alternating current generator, for maintaining the frequency of alternating current output from said synchronous alternating current generator slightly above the frequency of the commercial power on the grid and in a ready condition for input to said second variable speed drive to provide clean, conditioned power to the critical electric equipment load;

g) said third interrupt contactor, interposed the output of said synchronous alternating current generator and the input of said second synchronous drive, arranged to close upon interruption of the commercial electric power and opening of said first and second contactors, to allow the kinetic energy in said rotating fly-wheel to drive said synchronous alternating current generator, without further input power from said first variable speed drive or said synchronous motor, and pass a regulated alternating current and voltage and a decaying frequency from said synchronous alternating current generator to said second variable speed drive for input to the critical electric equipment load, h) wherein the input feed line of said second interrupt contactor, interposed said synchronous alternating current generator and said second variable speed drive, is separate from the input feed line of said power grid so that, power from said rotating fly-wheel drives said synchronous alternating current generator and produces a regulated alternating current and a decaying frequency from said synchronous alternating current generator to said second variable speed drive for supplementing the commercial power to the load.

8. The emergency supplemental power supply for outage protection of critical electric equipment load powered from a commercial power grid of claim 7 wherein said first and second normally-closed commercial power contactors, for opening and isolating the commercial power grid and for opening and isolating said variable speed drive upon commercial power interruption, and a third interrupt contactor, remain closed during commercial power input to the load and open during outage of the commercial power and when said third interrupt contactor remains open during commercial power input to the load and closes during outage of the commercial power.

9. The emergency supplemental power supply for outage protection of critical electric equipment load powered from a commercial power grid of claim 7 wherein said fly-wheel includes a fly-wheel loading of sufficient kinetic energy sufficient for the appropriate synchronous alternating current generator, the critical electric equipment load, and the time required for an orderly shutdown of the equipment upon commercial power outage.

10. The emergency supplemental power supply for outage protection of critical electric equipment load powered from a commercial power grid of claim 7 wherein said means for coupling said asynchronous motor to said fly-wheel and means for coupling said fly-wheel to said synchronous alternating current generator includes a mechanical clutch.

11. An emergency supplemental power supply for outage protection of critical electric equipment load powered from a commercial power grid, comprising:
   a) a first variable speed drive in parallel with the critical electric equipment load;
   b) a second variable speed drive interposed the commercial power grid and the critical electric equipment load;
   c) a first asynchronous motor powered from said first variable speed drive for turning a fly-wheel attached thereto to ramp-up and maintain a level of expendable kinetic energy in said fly-wheel;
   d) means for coupling said fly-wheel to a first synchronous alternating current generator for driving said generator in a no-load, standby condition;
   e) a second asynchronous motor coupled to a second synchronous alternating current generator, in combination, and interposed said second variable speed drive and the critical electric equipment load;
   f) computer processor control means interconnected said first and second variable speed drives, said synchronous alternating current generator, said second asynchronous motor/second synchronous alternating current generator combination, and an emergency contactor for maintaining the frequency of alternating current output from said synchronous alternating current generator slightly above the frequency of the commercial power on the grid and in a ready condition for input to said second variable speed drive;
   g) said emergency contactor, interposed the output of said first synchronous alternating current generator and said second variable speed drive, and arranged for closing upon the sagging or outage of incoming grid power to the critical electric equipment load, allows the kinetic energy in said rotating fly-wheel to drive said first synchronous alternating current generator and produces a separate decaying alternating current frequency from said first synchronous alternating current generator to said second variable speed drive and through said second asynchronous motor/synchronous generator combination for supplementing the sag or outage of power from the commercial power grid to the load.

12. The emergency supplemental power supply for outage protection of critical electric equipment load powered from a commercial power grid of claim 11 further including a first grid input interrupt contactor interposed the power grid and the critical electric equipment load that remains closed during commercial power input to the load and that opens during outage of the commercial power and when said emergency contactor closes.

13. The emergency supplemental power supply for outage protection of critical electric equipment load powered from a commercial power grid of claim 11 wherein said fly-wheel includes a fly-wheel loading of sufficient kinetic energy sufficient for said appropriate synchronous alternating current generator, the critical electric equipment load, and the time required for an orderly shutdown of the equipment upon commercial power outage.

14. The emergency supplemental power supply for outage protection of critical electric equipment load powered from a commercial power grid of claim 11 wherein said coupling between said second asynchronous motor and said second synchronous generator is a mechanical clutch.

15. An emergency supplemental power supply for outage protection of critical electric equipment load powered from a commercial power grid, comprising:
   a) a first variable speed drive in parallel with the critical electric equipment load;
   b) a second variable speed drive interposed in series with the commercial power grid and the critical electrical equipment load and separately from said first synchronous alternating current generator;
   c) a first asynchronous motor powered from said first variable speed drive for turning a fly-wheel attached thereto to ramp-up and maintain a level of expendable kinetic energy in said fly-wheel;
   d) means for coupling said fly-wheel to a first synchronous alternating current generator for driving said first generator in a no-load, standby condition;
   e) a second asynchronous motor coupled to a second synchronous alternating current generator, in combination, and interposed said second variable speed drive and the critical electric equipment load; and,
   f) computer processor control means interconnected said first and second variable speed drives, said first synchronous alternating current generator, said second motor/generator combination and an emergency contactor for maintaining the frequency of alternating current output from said first synchronous alternating current generator slightly above the frequency of the commercial power on the grid and in a ready condition for input to said second variable speed drive and to the critical equipment load; and,
   g) the input line of said emergency contactor, interposed the output of said first synchronous alternating current generator and said second variable speed drive, is separate from the input line of said power grid so that, power from said rotating fly-wheel drives said first synchronous alternating current generator and produces a separate decaying alternating current frequency from said first synchronous alternating current generator to said second variable speed drive and through said second asynchronous motor—synchronous generator combination for providing clean conditioned power with total isolation from the commercial power grid supplementing the sag or outage of power from the commercial power grid to the load.

16. The emergency supplemental power supply for outage protection of critical electric equipment load powered from a commercial power grid of claim 15 further including a first grid input interrupt contactor interposed the power grid and the critical electric equipment load that remains closed during commercial power input to the load and that opens during interruption of the commercial power and when said emergency contactor closes.

17. The emergency supplemental power supply for outage protection of critical electric equipment load powered from a commercial power grid of claim 15 wherein said fly-wheel includes a fly-wheel loading of sufficient kinetic energy sufficient for the appropriate synchronous alternating current generator, the critical electric equipment load, and the time required for an orderly shutdown of the equipment upon commercial power failure.

18. An emergency supplemental power supply for outage protection of critical electric equipment load powered from a commercial power grid, of comprising:
   a) a first variable speed drive in parallel with the critical electric equipment load,
   b) a second variable speed drive interposed in series with the commercial power grid and the critical electric equipment load;
   c) a first asynchronous motor powered from said first variable speed drive for turning a fly-wheel attached thereto to ramp-up and maintain a level of expendable kinetic energy in said fly-wheel;
   d) means for coupling said fly-wheel to a first synchronous alternating current generator for driving said generator in a no-load, standby condition;
   e) a second asynchronous motor coupled to a second synchronous alternating current generator, in combination, and interposed said second variable speed drive and the critical electric equipment load;
   f) a prime mover including means for coupling said prime mover to said second asynchronous motor/second synchronous alternating current generator combination; and,
   g) a computer processor interconnected said first and second variable speed drives, said first synchronous alternating current generator, said second asynchronous motor/second synchronous alternating current generator combination, said prime mover, and an emergency contactor for maintaining the frequency of alternating current output from said first synchronous alternating current generator slightly above the frequency of the commercial power on the grid and in a ready condition for input to said second variable speed drive;
   h) wherein, said emergency contactor, interposed the output of said first synchronous alternating current generator and said second variable speed drive, is arranged to close upon the sagging or outage of incoming grid power to the critical load and allow the kinetic energy in said rotating fly-wheel to drive said first synchronous alternating current generator and produce a decaying alternating current frequency from said synchronous alternating current generator to said second variable speed drive for supplementing the sag or outage in the commercial power grid to the load for a period sufficient to allow said prime mover to start and come up to a speed necessary to couple with said second asynchronous motor and provide lasting supplemental power to the load.

19. The emergency supplemental power supply for outage protection of critical electric equipment load powered from a commercial power grid of claim 18 further including a first grid input interrupt contactor interposed the power grid and the critical electric equipment load that remains closed during commercial power input to the load and that opens during outage of the commercial power and when said emergency contactor closes.

20. The emergency supplemental power supply for outage protection of critical electric equipment load powered from a commercial power grid of claim 18 wherein said fly-wheel includes a fly-wheel loading of sufficient kinetic energy sufficient for the appropriate synchronous alternating current generator, the critical electric equipment load, and the time required for an orderly shutdown of the equipment upon commercial power failure.

21. The emergency supplemental power supply for outage protection of critical electric equipment load powered from a commercial power grid of claim 18 wherein said means for coupling said fly-wheel to said synchronous alternating current generator is a clutch.

22. The emergency supplemental power supply for outage protection of critical electric equipment load powered from a commercial power grid of claim 18 wherein the power grid feed and the feed from said first synchronous generator into said second variable speed device are separate.

23. An emergency supplemental power supply for outage protection of critical electric equipment load powered from a commercial power grid, comprising:
   a) a variable speed drive in parallel with the critical electric equipment load;
   b) an asynchronous motor powered from said variable speed drive for turning a fly-wheel attached thereto to build and maintain a level of expendable kinetic energy in said fly-wheel;
   c) means for coupling said fly-wheel to a synchronous alternating current generator for driving said generator in a no-load, standby condition;
   d) a prime mover including means for coupling said prime mover to said synchronous alternating current generator;
   e) computer processor control means interconnected said variable speed drive, said synchronous alternating current generator, and an emergency contactor for maintaining the frequency of alternating current output from said synchronous alternating current generator slightly above the frequency of the commercial power on the grid and in a ready condition for use with the critical equipment load; and,
   f) an emergency generator contactor interposed the output of said synchronous alternating current generator and the critical equipment load, to allow the kinetic energy in said rotating fly-wheel to drive said synchronous alternating current generator, without further input power from said variable speed drive, and produce a decaying alternating current voltage and frequency from said synchronous alternating current generator to the load for a period sufficient to allow said prime mover to start and to come up to a speed necessary to couple with said synchronous generator and provide lasting supplemental power to the load.

24. The emergency supplemental power supply for outage protection of critical electric equipment load powered from a commercial power grid of claim 18 wherein said fly-wheel includes a fly-wheel loading of sufficient kinetic energy sufficient for the appropriate synchronous alternating current generator, the critical electric equipment load, and the time required for an orderly shutdown of the equipment upon commercial power outage.

25. The emergency supplemental power supply for outage protection of critical electric equipment load powered from a commercial power grid of claim 23 wherein said means for coupling said fly-wheel to said synchronous alternating current generator is a clutch.

26. The emergency supplemental power supply for outage protection of critical electric equipment load powered from a commercial power grid of claim 23 wherein the power grid feed and the feed from said first synchronous generator into said second variable speed device are separate.

* * * * *